(12) United States Patent
Soto et al.

(10) Patent No.: US 11,625,549 B2
(45) Date of Patent: *Apr. 11, 2023

(54) METHODS AND APPARATUSES FOR REMOVING A SECURITY TAG

(71) Applicant: Sensormatic Electronics, LLC, Boca Raton, FL (US)

(72) Inventors: Manuel A. Soto, Lake Worth, FL (US); Adam S. Bergman, Boca Raton, FL (US); Steve E. Trivelpiece, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,287

(22) Filed: Oct. 6, 2020

(65) Prior Publication Data

US 2021/0104138 A1 Apr. 8, 2021

Related U.S. Application Data

(60) Provisional application No. 62/912,570, filed on Oct. 8, 2019.

(51) Int. Cl.
| | |
|---|---|
| *E05B 73/00* | (2006.01) |
| *G08B 13/24* | (2006.01) |
| *G06K 7/10* | (2006.01) |
| *G07C 9/29* | (2020.01) |
| *G06K 19/07* | (2006.01) |

(52) U.S. Cl.
CPC ...... *G06K 7/10366* (2013.01); *E05B 73/0017* (2013.01); *G06K 19/0723* (2013.01); *G07C 9/29* (2020.01); *G08B 13/2411* (2013.01); *G08B 13/2434* (2013.01)

(58) Field of Classification Search
CPC ........... G08B 13/2434; G08B 13/2411; E05B 73/0017

See application file for complete search history.

(56) References Cited

U.S. PATENT DOCUMENTS

| | | | |
|---|---|---|---|
| 9,460,597 B1 * | 10/2016 | Clark | G08B 13/2454 |
| 2012/0161933 A1 * | 6/2012 | Shin | H04W 4/80 340/10.1 |

(Continued)

FOREIGN PATENT DOCUMENTS

| | | |
|---|---|---|
| EP | 3038066 A1 | 6/2016 |
| WO | 2016201311 A1 | 12/2016 |

OTHER PUBLICATIONS

International Search Report and Written Opinion issued in International Application No. PCT/US2020/054571 dated Jan. 21, 2021.

*Primary Examiner* — Hoi C Lau
(74) *Attorney, Agent, or Firm* — ArentFox Schiff

(57) ABSTRACT

Aspects of the present disclosure include methods, systems, and non-transitory computer readable media for receiving a confirmation signal to unlock the security tag from being locked to a merchandise, transmitting a RFID signal to the RFID device associated with the security tag to enable a controller to receive a release signal used to unlock the security tag from the merchandise, and transmitting the release signal to the controller to unlock the security tag from the merchandise.

21 Claims, 10 Drawing Sheets

(56) References Cited

U.S. PATENT DOCUMENTS

| | | | |
|---|---|---|---|
| 2013/0110657 A1* | 5/2013 | Forster | G06Q 20/20 |
| | | | 705/17 |
| 2016/0110571 A1* | 4/2016 | Jung | G06K 7/10257 |
| | | | 340/10.1 |
| 2016/0260302 A1* | 9/2016 | Ellers | G08B 13/2434 |
| 2016/0260303 A1* | 9/2016 | Strulovitch | G08B 13/2434 |
| 2016/0321894 A1* | 11/2016 | Schneider | G08B 13/242 |
| 2016/0351034 A1* | 12/2016 | Trivelpiece | G08B 13/242 |
| 2017/0053506 A1* | 2/2017 | Alexis | G08B 13/2434 |
| 2017/0178477 A1* | 6/2017 | Turgeon | G08B 13/2417 |
| 2018/0334836 A1* | 11/2018 | Miller | E05B 73/0017 |
| 2020/0285821 A1* | 9/2020 | Chandramowle | G06K 19/027 |
| 2021/0065525 A1* | 3/2021 | Soto | G08B 13/2408 |

* cited by examiner

METHODS AND APPARATUSES FOR REMOVING A SECURITY TAG

CROSS-REFERENCE TO RELATED APPLICATION

The current application claims priority to U.S. Provisional Application No. 62/912,570, filed on Oct. 8, 2019, entitled "System and Method for Using Low Frequency Wireless Communications to Detach a Security Tag from an Article Using a Detaching Pad," the contents of which are incorporated by reference herein in their entireties.

BACKGROUND

In an retail environment, lost, stolen, or misplaced merchandises may result in loss revenue for the store. As a counter measure, retail stores may place security tags on merchandises to prevent loss. The security tags may be removed only after the completion of a purchase to allow a customer that purchased a merchandise to properly exit the retail store. However, after the completion of the purchase, the security tags may require manual removal, which may be time-consuming and/or prone to error. Further, the removal process of a security tag associated with a purchased merchandise may cause unintended removal of other security tags (associated with unpurchased merchandises) in the vicinity of the security tag associated with the purchased merchandise. Therefore, improvements in tag removal may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media for receiving a confirmation signal to unlock the security tag from being locked to a merchandise, transmitting a RFID signal to the RFID device associated with the security tag to enable a controller to receive a release signal used to unlock the security tag from the merchandise, and transmitting the release signal to the controller to unlock the security tag from the merchandise.

An aspect of the present disclosure includes a method including receiving a confirmation signal to unlock the security tag from being locked to a merchandise, transmitting a RFID signal to the RFID device associated with the security tag to enable a controller to receive a release signal used to unlock the security tag from the merchandise, and transmitting the release signal to the controller to unlock the security tag from the merchandise.

Aspects of the present disclosure includes a scanner having a release signal transmitter, a RFID driver, memory that stores instructions, and a processor configured to execute the instructions to: receive a confirmation signal to unlock the security tag from being locked to a merchandise, cause the RFID driver to transmit a RFID signal to the RFID device associated with the security tag to enable a controller to receive a release signal used to unlock the security tag from the merchandise, and cause the release signal transmitter to transmit the release signal to the controller to unlock the security tag from the merchandise.

Certain aspects of the present disclosure includes a non-transitory computer readable medium having instructions stored therein that, when executed by a processor, cause the processor to receive a confirmation signal to unlock the security tag from being locked to a merchandise, transmit a RFID signal to the RFID device associated with the security tag to enable a controller to receive a release signal used to unlock the security tag from the merchandise, and transmit the release signal to the controller to unlock the security tag from the merchandise.

Aspects of the present disclosure include methods, security tags, and non-transitory computer readable media for receiving a radio frequency identification (RFID) signal to enable a controller of the security tag to receive a release signal used to detach the security tag from a merchandise, sending an enablement signal, in response to receiving the RFID signal, to the controller to receive the release signal, receiving the release signal, generating an unlocking signal, in response to receiving the release signal, for unlocking a lock mechanism of the security tag, wherein a first electrical energy of the unlocking signal is derived from at least a portion of a second electrical energy of the release signal, and, sending an unlocking signal to the lock mechanism to detach the security tag from the merchandise.

Aspects of the present disclosure includes a security tag having a radio frequency identification (RFID) device configured to receive a RFID signal to enable a controller of the security tag to receive a release signal used to detach the security tag from a merchandise, and send an enablement signal, in response to receiving the RFID signal, to the controller to receive the release signal, the controller configured to receive the release signal, generate an unlocking signal, in response to receiving the release signal, for unlocking a lock mechanism of the security tag, wherein a first electrical energy of the unlocking signal is derived from at least a portion of a second electrical energy of the release signal, and send an unlocking signal to the lock mechanism to detach the security tag from the merchandise, and the lock mechanism configured to unlock in response to receiving the unlocking signal.

Certain aspects of the present disclosure includes a non-transitory computer readable medium having instructions stored therein that, when executed by a processor, cause the processor to receive a radio frequency identification (RFID) signal to enable a controller of the security tag to receive a release signal used to detach the security tag from a merchandise, send an enablement signal, in response to receiving the RFID signal, to the controller to receive the release signal, receive the release signal, generate an unlocking signal, in response to receiving the release signal, for unlocking a lock mechanism of the security tag, wherein a first electrical energy of the unlocking signal is derived from at least a portion of a second electrical energy of the release signal, and, send an unlocking signal to the lock mechanism to detach the security tag from the merchandise.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
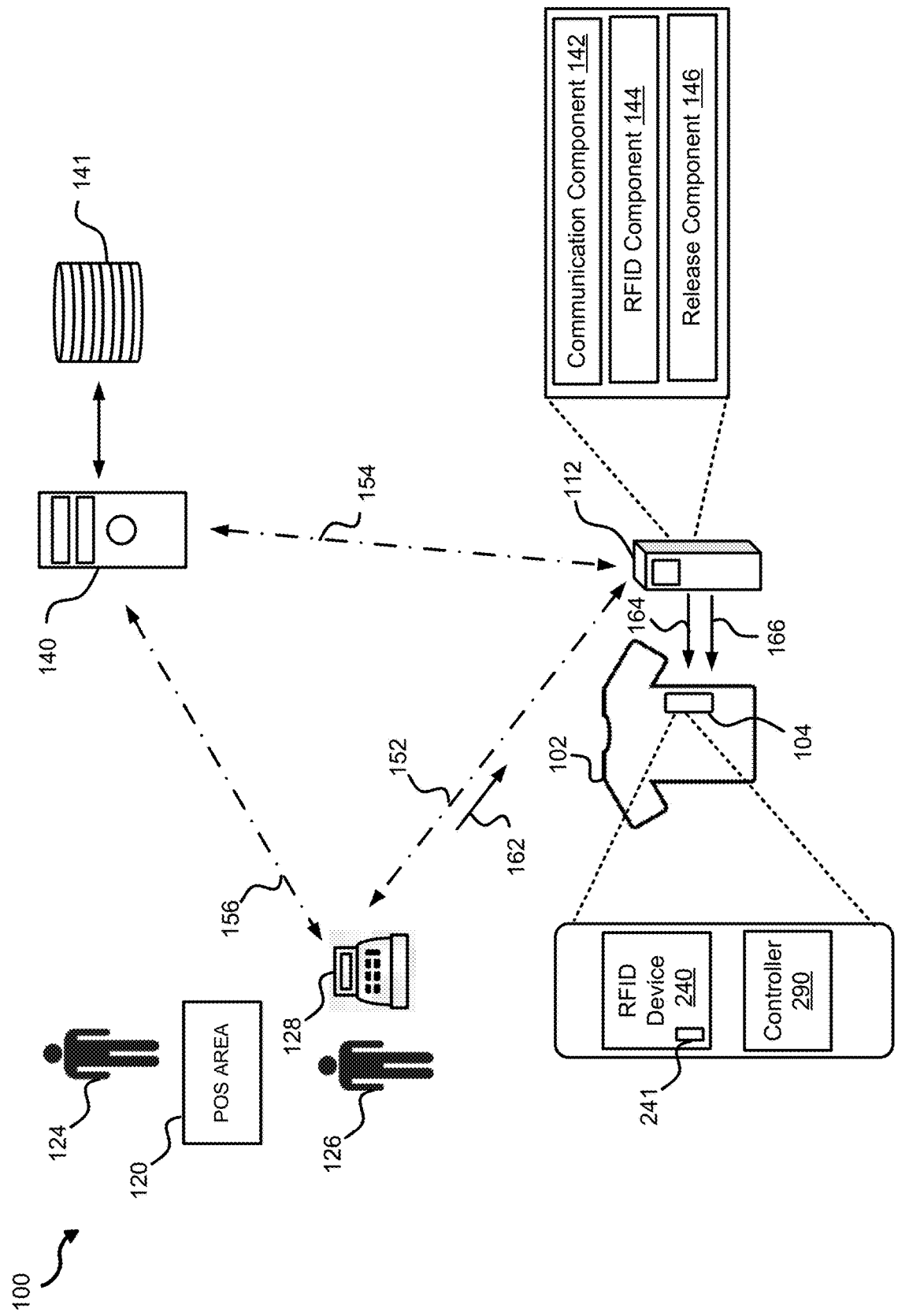
FIG. 1 illustrates an example of an environment for implementing a security tag removal process in accordance with aspects of the present disclosure.

The following includes definitions of selected terms employed herein. The definitions include various examples and/or forms of components that fall within the scope of a term and that may be used for implementation. The examples are not intended to be limiting.

In some aspects of the present disclosure, a security tag may include a radio frequency identification (RFID) device. The security tag may be utilized to deter retail loss. For example, staff of a retail store may lock the security tag to a merchandise. After a customer purchases the merchandise, the security tag may be removed from the merchandise. In an aspect of the present disclosure, the removal system may be connected and in communication with a purchase system. After the customer purchases the merchandise, the purchase system may transmit a confirmation signal to the removal system indicating the purchase. In response to receiving the confirmation signal, the removal system may transmit a RFID signal to the RFID device of the security tag, wherein the RFID signal is configured to unlock the security tag from the merchandise. For example, the RFID signal may include an alphanumeric sequence. If a controller of the security tag matches the alphanumeric sequence from the RFID signal with an internal "unlocking sequence," the controller may determine that the RFID signal has been authenticated and unlock the lock mechanism as described below. Further, the removal system may transmit a release signal to the controller on the security tag to energize the security tag to enable operation of a lock mechanism. As a result, the release signal energizes the security tag to enable the security tag to unlock the lock mechanism from the merchandise in response to the "unlocking" RFID signal. The electrical energy in the release signal may be converted to mechanical energy to unlock the lock mechanism. For example, the electrical energy of the release signal may inductively cause a lock to move from a lock position to an unlock position.

The present disclosure proposes to use low frequency wireless communications between a security tag detaching pad and a self-detachable security tag by transmitting tag self-detach commands with the unique tag ID. For example, the detaching pad may embed the unique tag ID into the "unlocking" RFID signal. The detaching pad may transmit the "unlocking" RFID signal to a number of security tags. Each one of the security tag may compare the unique tag ID in the RFID signal with an internal unique tag ID. The security tag with the internal unique tag ID identical to the unique tag ID in the RFID signal may transmit the release signal to the controller to begin the unlocking process described above in response to receiving the "unlocking" RFID signal. The other security tags may receive the "unlocking" RFID signal and refrain from transmitting the release signal to the corresponding controllers.

Existing implementation of self-detaching security tags in retail environments may require the use a proprietary and unique RFID chip to allow two way communications between the reader and the tag. The RF sensitivity of such existing RFID chips is inferior to other offerings, which negatively impacts the read performance of the tag. In addition, the cost of the RFID chip is much higher than in other offerings.

The current implementation of the tag uses a low frequency tuned coil configured to generate induction power. In addition to induction power, the coil can be used as a communications medium to the tag. Aspects of the present disclosure will allow for the RFID portion of the tag to be completely decoupled from the detachment or unlocking mechanism, which enables a tag of the present disclosure to use of any high sensitivity and lower cost RFID chip.

For example, in operation, the self-detaching tag will be inventoried by an RFID Reader at the Point of Sale (POS). Once the tag is inventoried (using RFID), the Electronic Product Code (EPC) of the tag is sent to the detaching pad. The detaching pad sends a "Detach Tag" command (including the unique ID of the tag from the EPC) to the tag by modulating a low frequency signal. Once the tag receives and decodes the command, it validates the unique ID in order to assure that it is the intended recipient of the command. Once the ID is validated, the tag detaches.

Once the tag is detached the tag sends a "Tag_Detached" command to the pad in order to complete the transaction. The tag may include an energy storage capacitor in order to store the energy received from the pad. This energy will be used by the tag to send the "Tag_Detached" command to the pad.

Referring to FIG. 1, in a non-limiting implementation, an example of an environment 100 (e.g., a retail store) for loss prevention according to aspects of the present disclosure. The environment 100 may include a merchandise 102 having a security tag 104 attached to the merchandise 102. The security tag 104 may be locked (e.g., unable to be removed from the merchandise 102 without damaging the merchandise 102) to prevent unauthorized removal from the merchandise 102. The security tag 104 may include a RFID device 240 configured to transmit and/or receive RFID signals. The security tag 104 and/or RFID device 240 may include a tag identifier 241. The security tag 104 may include a controller 290 configured to unlock the security tag 104. For example, the controller 290, in response to receiving the "unlocking" RFID signal, may transmit an unlocking signal to a lock mechanism (described below). The unlocking signal may cause the lock mechanism to receive a release signal. The lock mechanism may convert the electrical energy of the release signal to mechanical energy to move a lock in the lock mechanism from a lock position to an unlock position.

In certain implementations, the environment 100 may include a cash register 128 operating in a point-of-sale (POS) area 120. The cash register 128 may complete a sale associated with the merchandise 102. The cash register 128 may be configured to transmit a signal to a server 140 indicating the completion of the sale associated with the merchandise 102.

In some implementations, the environment 100 may include the server 140 and an optional data repository 141. The server 140 may communicate with a RFID scanner 112 and/or the cash register 128 via communication links 154, 156. The communication links 154, 156 may be wired or wireless communication channels.

In one aspect of the present disclosure, the environment 100 may include the RFID scanner 112 configured to transmit and/or receive RFID signals and/or release signals. The RFID scanner 112 may include a communication component 142 configured to communicate with the server 140 via the communication link 154 and/or the cash register 128 via the communication link 152. The RFID scanner 112 may include a RFID component 144 that and/or receives RFID signals. The RFID scanner 112 may include a release component 146 that transmits and/or receives release signals to the security tag 104. One or more of the communication component 142, the RFID component 144, and/or the release component 146 may be configured as hardware (e.g., application specific integrated circuit, application processors, field programmable gate arrays, etc.), software (e.g., instructions stored in a memory executed by a processor of the RFID scanner 112), or a combination thereof.

During operation, in an implementation, the security tag 104 may be attached to the merchandise 102. The attachment may include a lock mechanism (described below) that prevents unauthorized detachment of the security tag 104 from the merchandise 102. The security tag 104 may prevent and/or deter unauthorized removal of the merchandise 102 from the environment 100.

In some implementations, a customer 124 may attempt to purchase the merchandise 102. The merchandise 102 may be attached to the security tag 104. For example, the cash register 128 may receive price identification information (e.g., bar code scanned by the cash register 128 or price tag input by the clerk 126 and/or the customer 124) associated with the merchandise 102. In response, the cash register 128 may present a price of the merchandise 102 to the customer 124. The cash register 128 may receive payment (e.g., credit card, cash, or check) from the customer 124.

In certain implementations, the RFID scanner 112 may transmit an interrogating signal to the RFID device 240. In response, the RFID scanner 112 may receive a response signal including the tag identifier 241 (e.g., the RFID hardware address, the RFID serial number, the EPC, etc.). The RFID scanner 112 may transmit the tag identifier 241 to the cash register 128 via the communication link 152. In response to receiving the tag identifier 241, the cash register 128 may associate the sale of the merchandise 102 with the tag identifier 241.

In some variations, the cash register 128 may transmit a confirmation signal 162 to the RFID scanner 112. The confirmation signal 162 may indicate to the RFID scanner 112 that the merchandise 102 associated with the security tag 104 has been properly purchased. The confirmation signal 162 may indicate to the RFID scanner 112 to proceed with unlocking the security tag 104 (described in more detail below). The RFID scanner 112 may receive the confirmation signal 162 from the cash register 128 via the communication link 152 and/or from the server via the communication link 156. The confirmation signal 162 may include some or all of the following information: merchandise information of the merchandise 102, the tag identifier 241, an indication to unlock the security tag 104 from the merchandise, etc.

In one aspect of the present disclosure, the RFID scanner 112 may transmit a RFID signal 164 to the RFID device 240 of the security tag 104. The RFID signal 164 may indicate to RFID device 240 to enable the controller 290 to receive a subsequently and/or a contemporaneously transmitted release signal 166 used to unlock the security tag 104 from the merchandise 102. For example, the RFID signal 164 may include an unlocking alphanumeric sequence and/or an unlocking tag identifier. The RFID device 240 may compare the unlocking tag identifier to the tag identifier 241. If the unlocking tag identifier is identical to the tag identifier 241, the RFID device 240 may determine that the RFID signal 164 is authenticated and the RFID scanner 112 transmitted the RFID signal 164 to unlock the security tag 104. If the unlocking tag identifier is different than the tag identifier 241, the RFID device 240 may determine that the RFID signal 164 is not authenticated and the RFID signal 164 is meant for another security tag.

If the RFID signal 164 is authenticated, the RFID device 240 may compare the unlocking alphanumeric sequence with an internal alphanumeric sequence. If the unlocking alphanumeric sequence and the internal alphanumeric sequence are identical, the RFID device 240 may determine that the RFID signal 164 is transmitted by the RFID scanner 112 (instead of an unauthorized device trying to unlock the security tag 104) to unlock the security tag 104. As a result, the RFID device 240 may transmit an enablement signal (described below) to the controller 290. The enablement signal may indicate to the controller 290 to enable a lock mechanism (described below) to receive a release signal to unlock the security tag 104 from the merchandise 102.

In some instances, the RFID signal 164 may be encrypted. For example, the RFID signal 164 may be encrypted with symmetric or asymmetric encryption. The RFID signal 164 may be encrypted with advanced encryption standard (AES) algorithm, data encryption standard (DES) algorithm, MD5 encryption algorithm, or other suitable encryption algorithms. The encryption may prevent unauthorized devices from accessing the content of the RFID signal 164. For example, the RFID scanner 112 may encrypt the contents of the RFID signal 164 (e.g., alphanumeric sequence and/or an unlocking tag identifier) with a public key of an asymmetric encryption algorithm. The RFID device 240 may be configured to decrypt the encrypted contents using a corresponding private key of the asymmetric encryption algorithm.

In one implementation, the RFID signal 164 may be encrypted. Specifically, the RFID signal 164 may include an encrypted unlocking tag identifier. Upon receiving the RFID signal 164, the RFID device 240 may decrypt the encrypted unlocking tag identifier. If the decrypted unlocking tag identifier is identical to the tag identifier 241, the RFID device 240 may transmit the enablement signal to the controller 290 to unlock the security tag 104.

In alternative implementations, the release signal 166 may include a particular waveform associated with an authorized release signal. The controller 290 may only unlock the security tag 104 in response to receiving the release signal 166 having the particular waveform from the RFID scanner 112. Other signals transmitted to the controller 290 (with different waveforms) may not unlock the security tag 104. The controller 290 may use the waveform of the release signal 166 to distinguish between authorized transmission of the release signal 166 and the unauthorized transmission of the release signal 166. For example, if the controller 290 identifies the release signal 166 as the authorized release signal with the particular waveform, the controller 290 may determine that the release signal 166 is transmitted by an authorized detaching device (i.e., the RFID scanner 112) and proceed to transmit an unlocking signal (described below) to the lock mechanism to unlock the security tag 104. If the release signal 166 may have a waveform different than the particular waveform of the authorized release signal, the controller 290 may determine that the release signal 166 is transmitted by an unauthorized detaching device and refrain from transmitting the unlocking signal.

Figure 2:
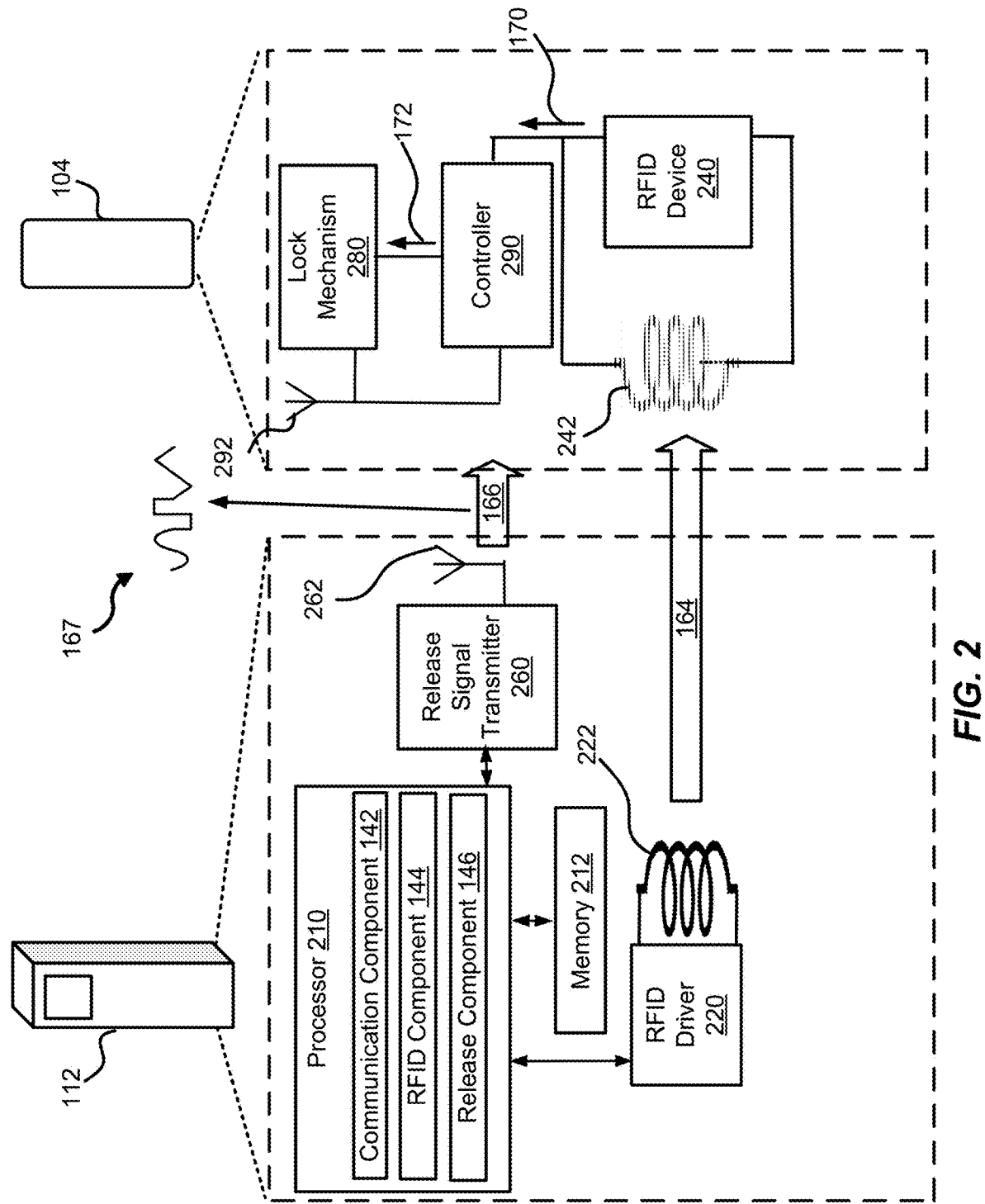
FIG. 2 illustrates an example of a radio frequency identification (RFID) scanner and a security tag in accordance with aspects of the present disclosure.

Referring to FIGS. 1 and 2, an example of the RFID scanner 112 may be configured to transmit the RFID signal 164 and/or the release signal 166 to the security tag 104. The RFID scanner 112 may include a processor 210 that executes instructions stored in a memory 212 for performing the unlocking functions described herein.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, controllers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some implementations, the RFID scanner 112 may include the memory 212. The RFID scanner 112 may include a RFID driver 220 configured to transmit and/or receive RFID signals via a scanner coil 222. The RFID scanner 112 may include a release signal transmitter 260 configured to transmit a release signal 166 via a release signal antenna 262.

The processor 210 may cause the RFID driver 220 to transmit RFID signals, via the scanner coil 222, to the security tag 104. The RFID driver 220 may energize the scanner coil 222 to transmit the RFID signal 164. The scanner coil 222 may include one or more inductors and/or antennas that transmit or receive electromagnetic signals.

The processor 210 may include a release component 146 that causes the release signal transmitter 260 to transmit the release signal 166, via the release signal antenna 262, to the security tag 104.

In some aspects, the release signal transmitter 260 may transmit the release signal 166 to the security tag 104 to unlock the security tag 104 from the merchandise. The release signal 166 may be a low frequency signal (e.g., below 1 megahertz). The energy in the release signal 166 may be utilized by the security tag 104 for the unlock operation. The release signal 166 may be encrypted. For example, the release signal 166 may be encrypted with symmetric or asymmetric encryption. The release signal 166 may be encrypted with advanced encryption standard (AES) algorithm, data encryption standard (DES) algorithm, MD5 encryption algorithm, or other suitable encryption algorithms.

In some non-limiting examples, the security tag 104 may include the RFID device 240 that transmits and/or receives RFID signals via a tag coil 242. The RFID device 240 may transmit an enablement signal 170 to the controller 290 to transmit an unlocking signal 172 to the lock mechanism 280. The security tag 104 may include the controller 290 configured to transmit the unlocking signal 172 to enable the lock mechanism 280 to unlock. The security tag 104 may include a lock mechanism 280 that securely fastens the security tag 104 to the merchandise 102.

During operation, in some implementations, the processor 210 and/or the memory 212 may receive the confirmation signal 162 from the cash register 128 and/or the server 140. The confirmation signal 162 may include an indication to unlock the security tag 104 to detach from the merchandise 102. The confirmation signal 162 may include the tag identifier 241. Alternatively or additionally, after receiving the confirmation signal 162, the RFID driver 220 may transmit an interrogating signal to the RFID device 240 and receive a response signal including the tag identifier 241.

In an implementation, the processor 210, the memory 212, the RFID component 144, the RFID driver 220, and/or the scanner coil 222 may transmit the RFID signal 164 to the tag coil 242 of the security tag 104. In response to receiving the RFID signal 164, the RFID device 240 may transmit an enablement signal 170 to enable the controller 290 and/or the lock mechanism 280 to receive the release signal 166 to unlock the lock mechanism 280.

In some implementations, the processor 210, the memory 212, the release component 146, the release signal transmitter 260, and/or the release signal antenna 262 may transmit the release signal 166 to the lock antenna 292 of the security tag 104. In response to the RFID device 240 receiving the RFID signal 164 (prior to or concurrent to receiving the release signal 166) and/or controller 290 receiving the enablement signal 170, the controller 290 may transmit the unlocking signal 172 to the lock mechanism 280. The controller 290 may utilize the electrical energy in the release signal 166 to generate the unlocking signal 172. In certain implementations, the release signal 166 may be a direct current signal or an alternative current signal. The controller 290 may be configured as one or more microprocessors, controllers, digital signal processors (DSPs), field programmable gate arrays (FPGAs), programmable logic devices (PLDs), state machines, gated logic, discrete hardware circuits, and other suitable hardware.

In some implementations, the controller 290 may be unable to receive the release signal 166 without receiving the RFID signal 164 beforehand. In other implementations, the controller 290 may be able to receive the release signal 166 without receiving the RFID signal 164, but unable to transmit the unlocking signal 172 without receiving the RFID signal 164 beforehand.

In alternative implementations, the controller 290 may receive release signal 166 only if a waveform 167 of the release signal 166 is substantially identical to a predetermined waveform. In such instances, the processor 210, the memory 212, the release component 146, the release signal transmitter 260, and/or the release signal antenna 262 may transmit the release signal 166 with the waveform 167 (e.g., amplitude pattern, frequency pattern, phase pattern, modulation, encoding, encryption, etc.). The controller 290 may determine that the waveform 167 of the release signal 166 is substantially identical to the predetermine waveform. As a result, the controller 290 may transmit the unlocking signal 172 to the lock mechanism 280 for unlocking.

In certain implementations, the lock mechanism 280 may unlock after receiving the unlocking signal 172. The lock mechanism 280 may utilize the electrical energy in the unlocking signal 172 to unlock.

In optional implementations, the RFID device 240 may transmit a detach confirmation signal to the RFID driver 220 indicating that the enablement signal 170 has been sent. The detach confirmation signal may indicate to the RFID scanner 112 that the security tag 104 has been unlocked and detached from the merchandise 102.

In optional implementations, the RFID signal 164 may include the tag identifier 241. In response to receiving the RFID signal 164, the RFID driver 220 may verify whether the tag identifier 241 is associated with the RFID driver 220 and/or the security tag 104. If the RFID driver 220 successfully verifies that the tag identifier 241 is associated with the RFID driver 220 and/or the security tag 104, the RFID device 240 may transmit an enablement signal 170 to enable the controller 290 and/or the lock mechanism 280 to receive the release signal 166 to unlock the lock mechanism 280.

Alternatively or additionally, the RFID driver 220 may transmit the tag identifier 241 to the controller 290. The controller 290 may verify whether the tag identifier 241 is associated with the security tag 104. If the controller 290 successfully verifies that the tag identifier 241 is associated with the security tag 104, the controller 290 may transmit the unlocking signal 172 to the lock mechanism 280.

Figure 3:
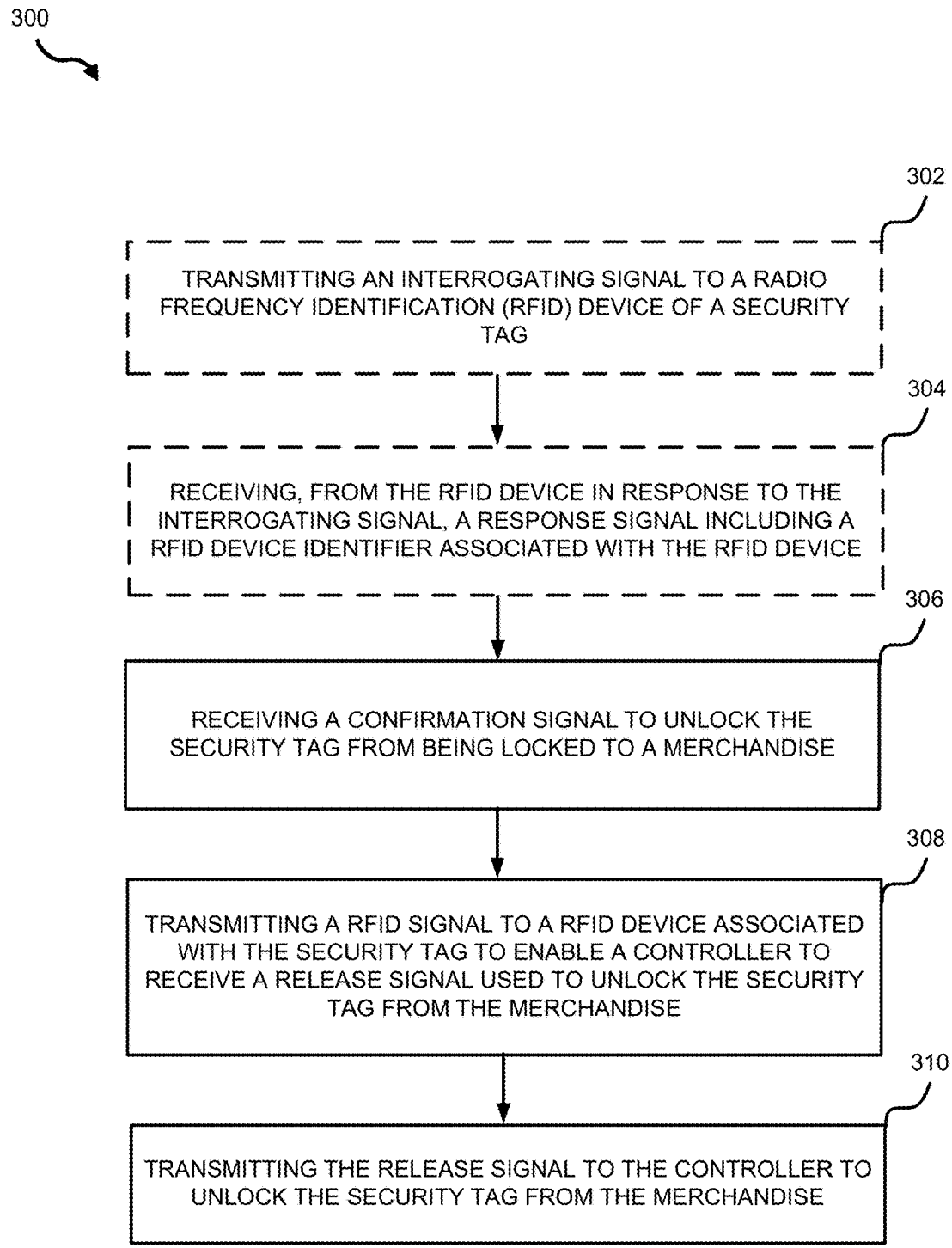
FIG. 3 illustrates an example of a method for transmitting a RFID signal to remove a security tag in accordance with aspects of the present disclosure.

Turning to FIG. 3, an example of a method 300 for unlocking a security tag may be performed by the RFID scanner 112, one or more of the communication component 142, the RFID component 144, and/or the release component 146, the RFID driver 220, the scanner coil 222, the release signal transmitter 260, and/or the release signal antenna 262.

At block 302, the method 300 may optionally transmit an interrogating signal to a radio frequency identification (RFID) device of a security tag. For example, the processor 210, the memory 212, the RFID component 144, the RFID driver 220, and/or the scanner coil 222 may transmit an interrogating signal to the RFID device 240 of the security tag as described above. The processor 210, the memory 212, the RFID component 144, the RFID driver 220, and/or the scanner coil 222 may be configured to and/or define means for transmitting an interrogating signal to a radio frequency identification (RFID) device of a security tag.

At block 304, the method 300 may optionally receive, from the RFID device in response to the interrogating signal, a response signal including a tag identifier associated with the security tag. For example, the processor 210, the memory 212, the RFID component 144, the RFID driver 220, and/or the scanner coil 222 may receive, from the RFID device 240 in response to the interrogating signal, a response signal including the tag identifier 241 associated with the security tag 104 and/or the RFID device 240 as described above. The processor 210, the memory 212, the RFID component 144, the RFID driver 220, and/or the scanner coil 222 may be configured to and/or define means for receiving, from the RFID device in response to the interrogating signal, a response signal including a tag identifier associated with the security tag.

In certain implementations, the RFID scanner 112 may transmit the tag identifier 241 to the cash register 128 to identify the security tag 104 attached to the merchandise 102.

At block 306, the method 300 may receive a confirmation signal to unlock the security tag from being locked to a merchandise. For example, the processor 210, the memory 212, and/or the communication component 142 may receive the confirmation signal 162 indicating a confirmation of the sale of the merchandise 102 as described above. The confirmation signal 162 may optionally include the tag identifier 241. The confirmation signal 162 may indicate to the RFID scanner 112 to unlock the security tag 104. The processor 210, the memory 212, and/or the communication component 142 may be configured to and/or define means for receiving a confirmation signal to unlock the security tag being locked to a merchandise. For example, as described above, the RFID scanner 112 may receive the confirmation signal 162 that indicates the merchandise 102 associated with the security tag 104 has been properly purchased. The confirmation signal 162 may indicate to the RFID scanner 112 that the security tag 104 should be removed from the merchandise 102.

At block 308, the method 300 may transmit a RFID signal to the RFID device associated with the security tag to enable a controller to receive a release signal used to unlock the security tag from the merchandise. For example, the processor 210, the memory 212, the RFID component 144, the RFID driver 220, and/or the scanner coil 222 may transmit the RFID signal 164 to the RFID device 240 to enable the controller 290 to receive the release signal 166 used to unlock the security tag 104 from the merchandise 102. The processor 210, the memory 212, the RFID component 144, the RFID driver 220, and/or the scanner coil 222 may be configured to and/or define means for transmitting a RFID signal to the RFID device associated with the security tag to enable a controller to receive a release signal used to unlock the security tag from the merchandise. As described above, the RFID driver 220 may transmit the RFID signal 164 to the RFID device 240. The RFID device 240 may determine whether the RFID signal 164 is an authorized RFID signal or not (as described above). For example, the RFID driver 220 may transmit the RFID signal 164 having an alphanumeric sequence and/or an "unlocking" tag identifier. After receiving the RFID signal 164 having the alphanumeric sequence and/or the "unlocking" tag identifier, the RFID device 240 may compare the "unlocking" tag identifier with the tag identifier 241 and/or the alphanumeric sequence with an "unlocking" alphanumeric sequence (stored in the RFID device 240, the controller 290 and/or the security tag 104). If the "unlocking" tag identifier in the RFID signal 164 is identical to the tag identifier 241 and/or the alphanumeric sequence is identical to the "unlocking" alphanumeric sequence, the RFID device 240 may determine that the RFID scanner 112 and/or the RFID driver 220 transmitted the RFID signal 164 to unlock the security tag 104. Next, the RFID device 240 may transmit the enablement signal 170 to the controller 290 to enable the controller 290 to transmit the unlocking signal 172 to the lock mechanism 280. The transmission of the unlocking signal 172 may cause the lock mechanism 280 to receive the release signal 166 to unlock.

At block 310, the method 300 may transmit the release signal to the controller to unlock the security tag from the merchandise. For example, the processor 210, the memory 212, the release component 146, the release signal transmitter 260, and/or the release signal antenna 262 may transmit the release signal 166 to the controller 290 to unlock the security tag 104 from the merchandise 102. The processor 210, the memory 212, the release component 146, the release signal transmitter 260, and/or the release signal antenna 262 may be configured to and/or define means for transmitting the release signal to the controller to unlock the security tag from the merchandise. For example, as described above, the controller 290 may transmit the release signal 166 to the lock mechanism 280. In response to receiving the unlocking signal 172, the lock mechanism 280 may receive the release signal 166 and/or utilize the electrical energy in the release signal 166 to unlock the lock mechanism 280. In some implementations, the lock mechanism 280 may convert the electrical energy in the release signal 166 into mechanical energy to move a lock in the lock mechanism 280 from a locked position to an unlocked position.

In alternative implementations, the release signal transmitter 260 may transmit the release signal 166, with the waveform 167, to the controller 290 and/or the lock mechanism 280 for unlocking the lock mechanism 280.

Figure 4:
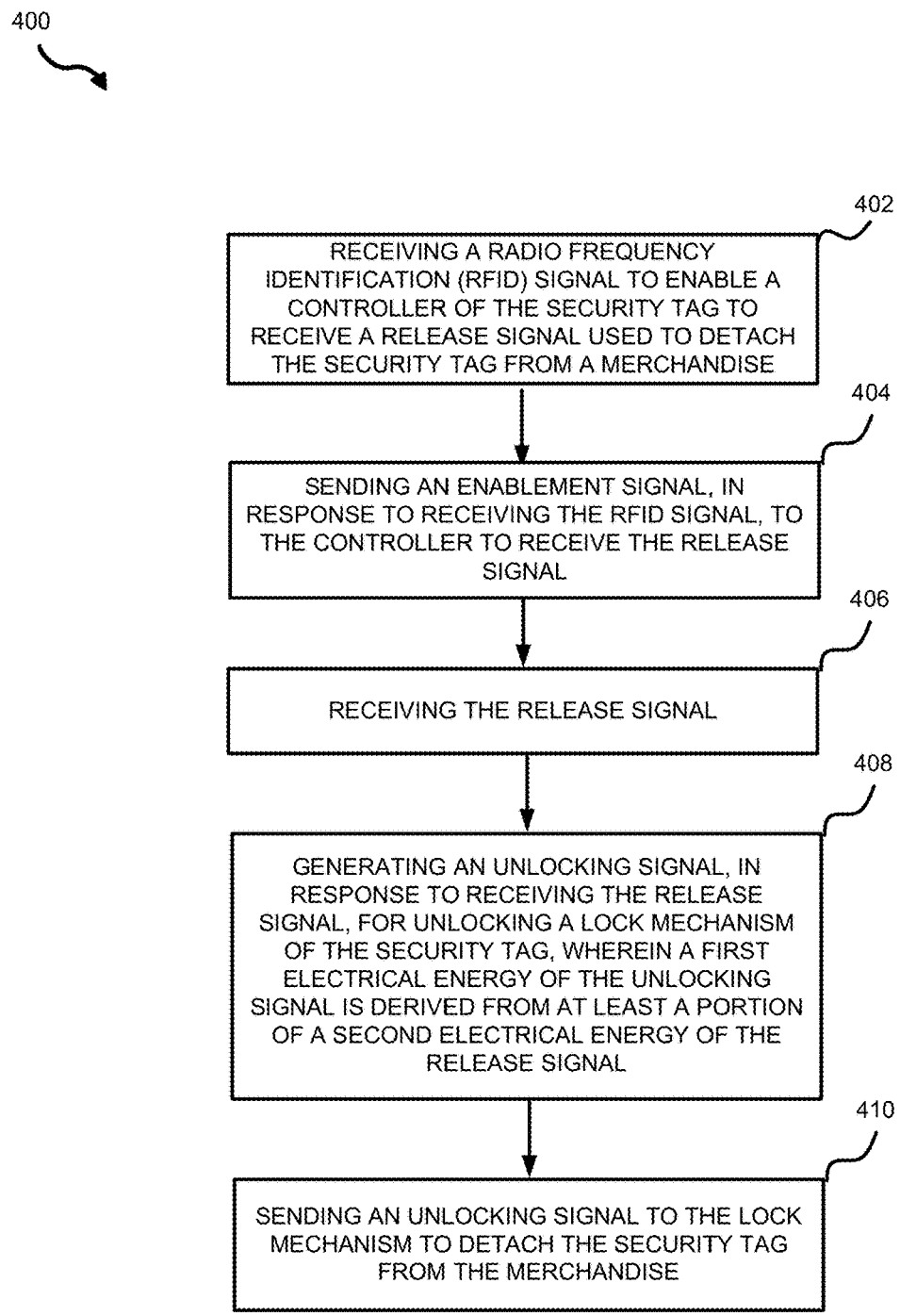
FIG. 4 illustrates an example of a method for removing a security tag in accordance with aspects of the present disclosure.

Turning to FIG. 4, an example of a method 400 for receiving release signal energy to unlock a security tag may be performed by the controller 290 and/or the RFID device 240.

At block 402, the method 400 may receive a radio frequency identification (RFID) signal to enable a controller of the security tag to receive a release signal used to detach the security tag from a merchandise. For example, the RFID device 240 may receive the RFID signal 164 via the tag coil 242 to enable the controller 290 of the security tag 104 to receive the release signal 166. The RFID device 240 and/or the tag coil 242 may be configured to and/or define means for receiving a radio frequency identification (RFID) signal to enable a controller of the security tag to receive a release signal used to detach the security tag from a merchandise. In certain examples, as described above, after receiving the RFID signal 164 having the alphanumeric sequence and/or the "unlocking" tag identifier, the RFID device 240 may compare the "unlocking" tag identifier with the tag identifier 241 and/or the alphanumeric sequence with an "unlocking" alphanumeric sequence (stored in the RFID device 240, the controller 290 and/or the security tag 104). If the "unlocking" tag identifier in the RFID signal 164 is identical to the tag identifier 241 and/or the alphanumeric sequence is identical to the "unlocking" alphanumeric sequence, the RFID device 240 may determine that the RFID scanner 112 and/or the RFID driver 220 transmitted the RFID signal 164 to unlock the security tag 104.

At block 404, the method 400 may send an enablement signal, in response to receiving the RFID signal, to the controller to receive the release signal. For example, the RFID device 240 may send the enablement signal 170 to the controller 290 to receive the release signal 166. The RFID device 240 may be configured to and/or define means for sending an enablement signal, in response to receiving the RFID signal, to the controller to receive the release signal. In an example, as described above, the RFID device 240 may send the enablement signal 170 to the controller 290 to receive the release signal 166. The enablement signal 170 may indicate that the RFID signal 164 is transmitted by an authorized device. Upon receiving the enablement signal 170, the controller 290 may receive and/or cause the lock mechanism 280 to receive the release signal 166. Without the enablement signal 170, the controller 290 and/or the lock mechanism 280 may block the reception of the release signal 166, and/or receive the release signal 166 without unlocking the lock mechanism 280.

At block 406, the method 400 may receive the release signal. For example, the lock mechanism 280 and/or the controller 290 may receive the release signal 166 via the lock antenna 292. The lock mechanism 280, the controller 290, and/or the lock antenna 292 may be configured to and/or define means for receiving the release signal. For example, as described above, the controller 290 and/or the lock mechanism 280 may receive the release signal 166. The controller 290, in response to receiving the enablement signal 170, may receive the release signal 166 and/or cause the lock mechanism 280 to receive the release signal 166.

At block 408, the method 400 may generate an unlocking signal, in response to receiving the release signal, for unlocking a lock mechanism of the security tag, wherein a first electrical energy of the unlocking signal is derived from at least a portion of a second electrical energy of the release signal. For example, the controller 290 may generate the unlocking signal 172 for unlocking the lock mechanism 280 of the security tag 104. The controller 290 may be configured to and/or define means for generating an unlocking signal, in response to receiving the release signal, for unlocking a lock mechanism of the security tag, wherein a first electrical energy of the unlocking signal is derived from at least a portion of a second electrical energy of the release signal. For example, as described above, the controller 290 may generate the unlocking signal 172 by using the electrical energy of the release signal 166. The unlocking signal 172 may include electrical energy used by the lock mechanism 280 to unlock.

At block 410, the method 400 may send an unlocking signal to the lock mechanism to detach the security tag from the merchandise. For example, the controller 290 may send the unlocking signal 172 to the lock mechanism 280 to detach the security tag 104 from the merchandise 102. The controller 290 may be configured to and/or define means for sending an unlocking signal to the lock mechanism to detach the security tag from the merchandise. For example, as described above, the controller 290 may send the unlocking signal 172 to the lock mechanism 280 to detach the security tag 104 from the merchandise 102. In some implementations, the electrical energy in the unlocking signal 172 may be converted to mechanical energy to unlock the lock mechanism 280. For example, the electrical energy of the unlocking signal 172 may inductively cause a lock in the lock mechanism 280 to move from a lock position to an unlock position.

In optional implementations, the RFID device 240 may send the enablement signal 170 to the controller 290. The enablement signal 170 may indicate to the controller 290 that the RFID device 240 has received an authenticated RFID signal (e.g., the RFID signal 164). In response, the controller 290 may transmit the unlocking signal 172 to the lock mechanism 280. The unlocking signal 172 may unable the lock mechanism 280 to receive the release signal 166, and/or convert the electrical energy in the release signal 166 to mechanical energy to cause a lock in the lock mechanism 280 to move from a lock position to an unlock position.

Figure 5:
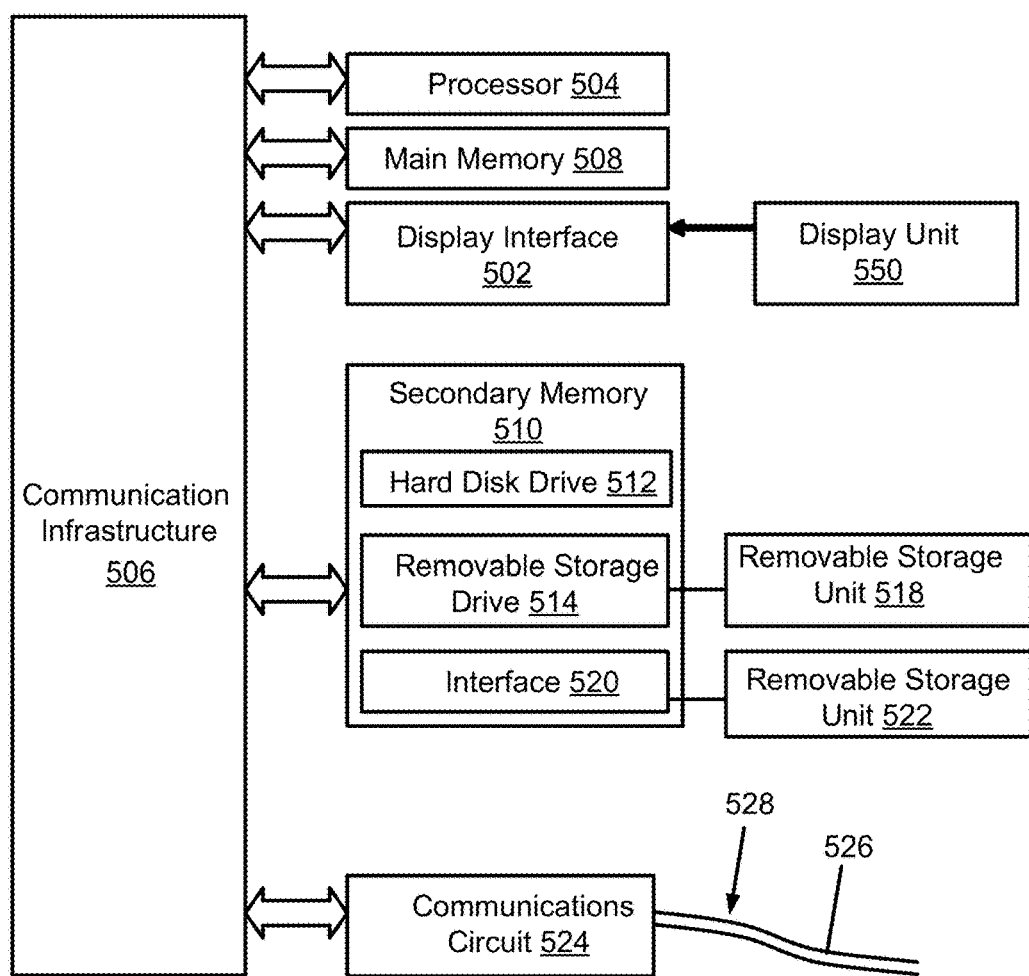
FIG. 5 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 500 is shown in FIG. 5. In some examples, the RFID scanner 112 may be implemented as the computer system 500 shown in FIG. 5. The RFID scanner 112 may include some or all of the components of the computer system 500.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 550. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and the removable storage unit 522 and the interface 520, which allow software and data to be transferred from the removable storage unit 522 to computer system 500.

Computer system 500 may also include a communications circuit 524. The communications circuit 524 may allow software and data to be transferred between computer system 500 and external devices. Examples of the communications circuit 524 may include a modem, a network interface (such as an Ethernet card), a communications port, a Personal Computer Memory Card International Association (PCMCIA) slot and card, etc. Software and data transferred via the communications circuit 524 are in the form of signals 528, which may be electronic, electromagnetic, optical or other signals capable of being received by the communications circuit 524. These signals 528 are provided to the communications circuit 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as the removable storage unit 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications circuit 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard disk drive 512, or the interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 6:
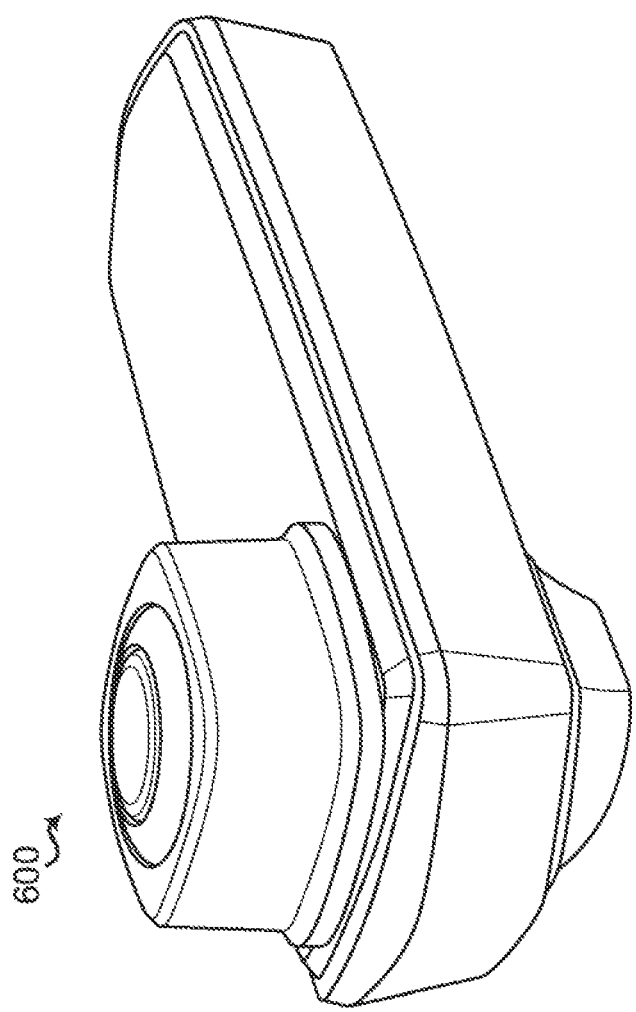
FIG. 6 illustrates an example of a security tag in a locked position in accordance with aspects of the present disclosure.
Figure 7:
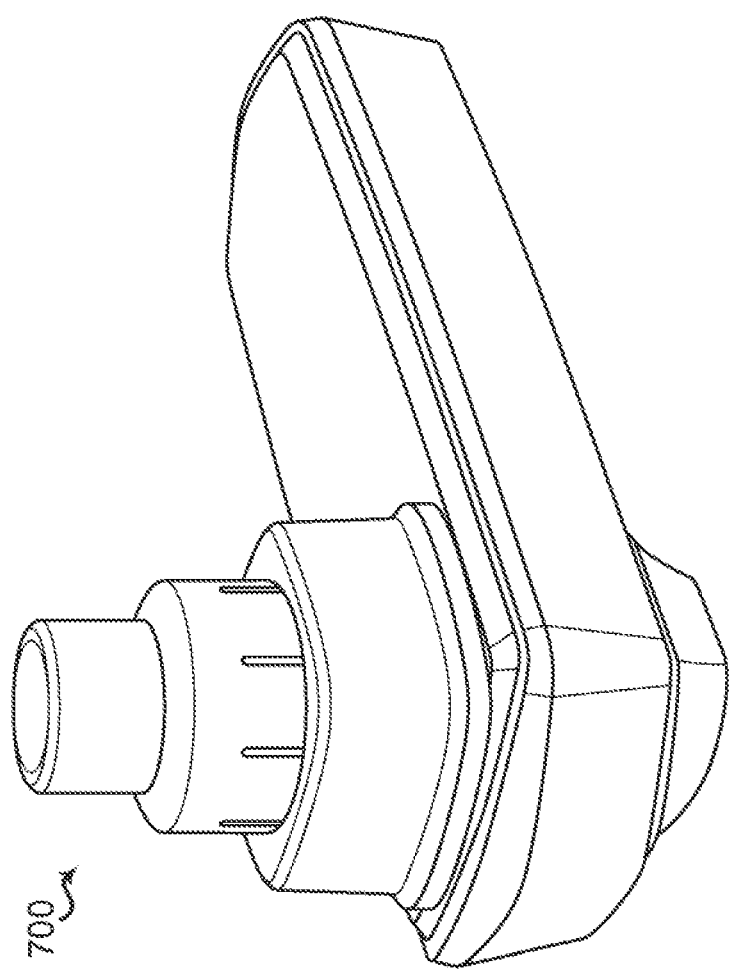
FIG. 7 illustrates an example of a security tag in an unlocked position in accordance with aspects of the present disclosure.

Referring to FIGS. 6 and 7, an example of the security tag 104 described herein may transition from a locked position 600 to an unlocked position 700 in response to receiving the RFID signal at the RFID device to unlock the security tag. For example, the security tag 104 may receive the RFID signal 164 to enable the RFID device 240 to receive the release signal 166. In response to the release signal 166, the security tag 104 may transition from the locked position 600 to the unlocked position 700.

Figure 8:
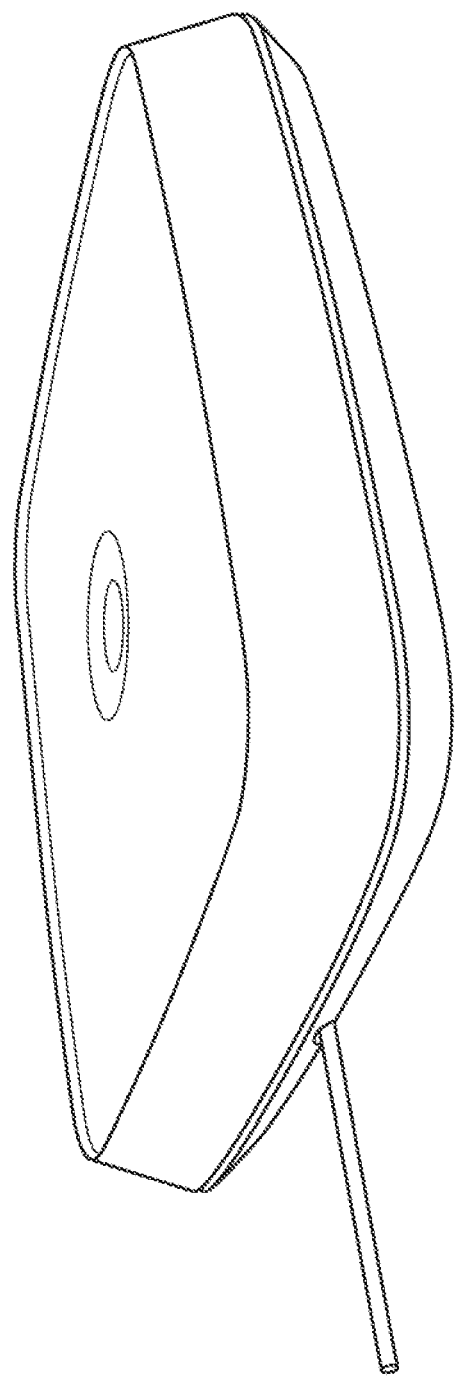
FIG. 8 illustrates an example of a RFID scanner in accordance with aspects of the present disclosure.
Figure 9:
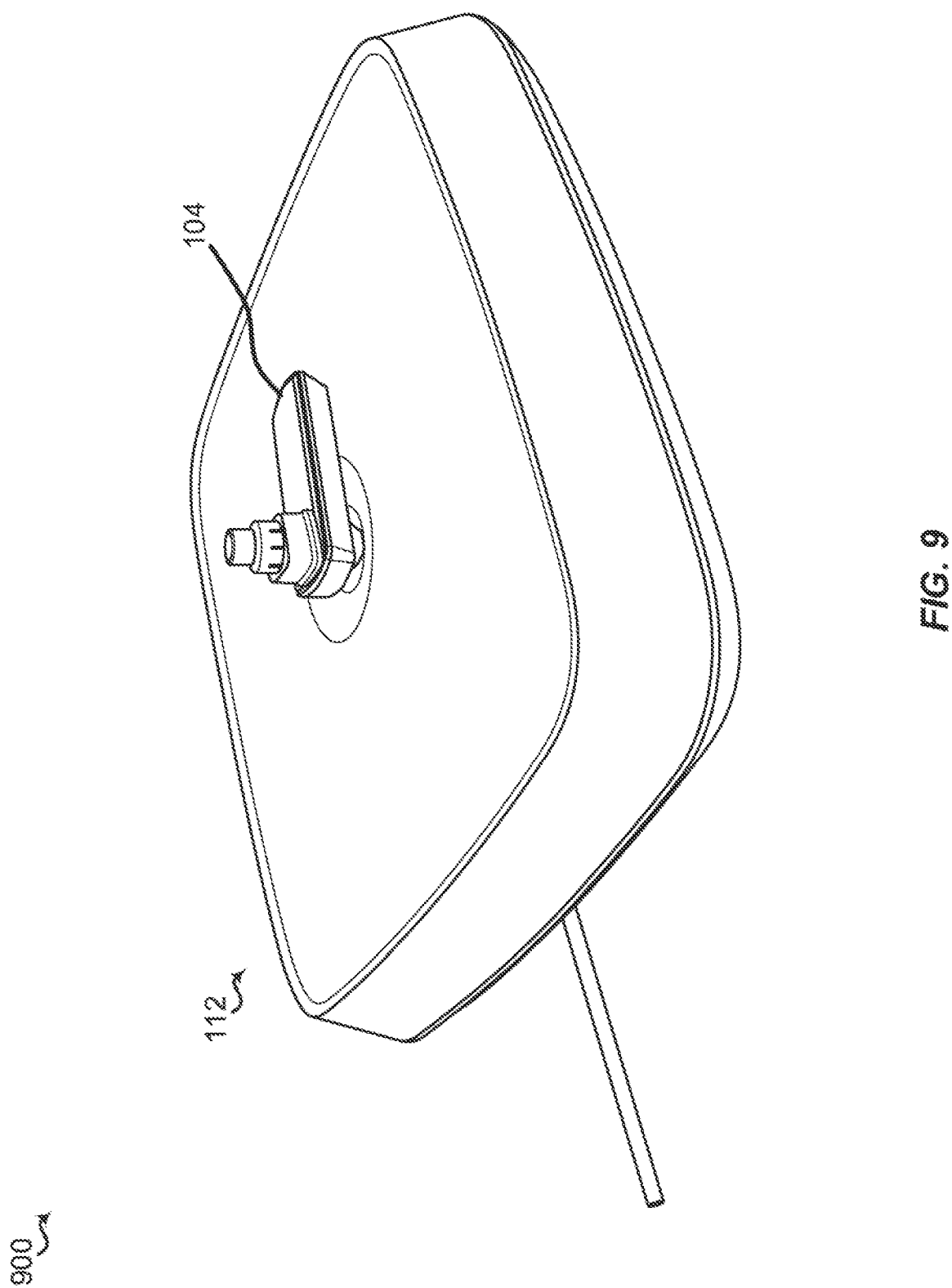
FIG. 9 illustrates an example of a system including a security tag and a RFID scanner in accordance with aspects of the present disclosure.

Referring to FIGS. 8 and 9, an example of the RFID scanner 112, and an example of a system 900 including the security tag 104 and the RFID scanner 112 represent one example implementation of the present disclosure.

Figure 10:
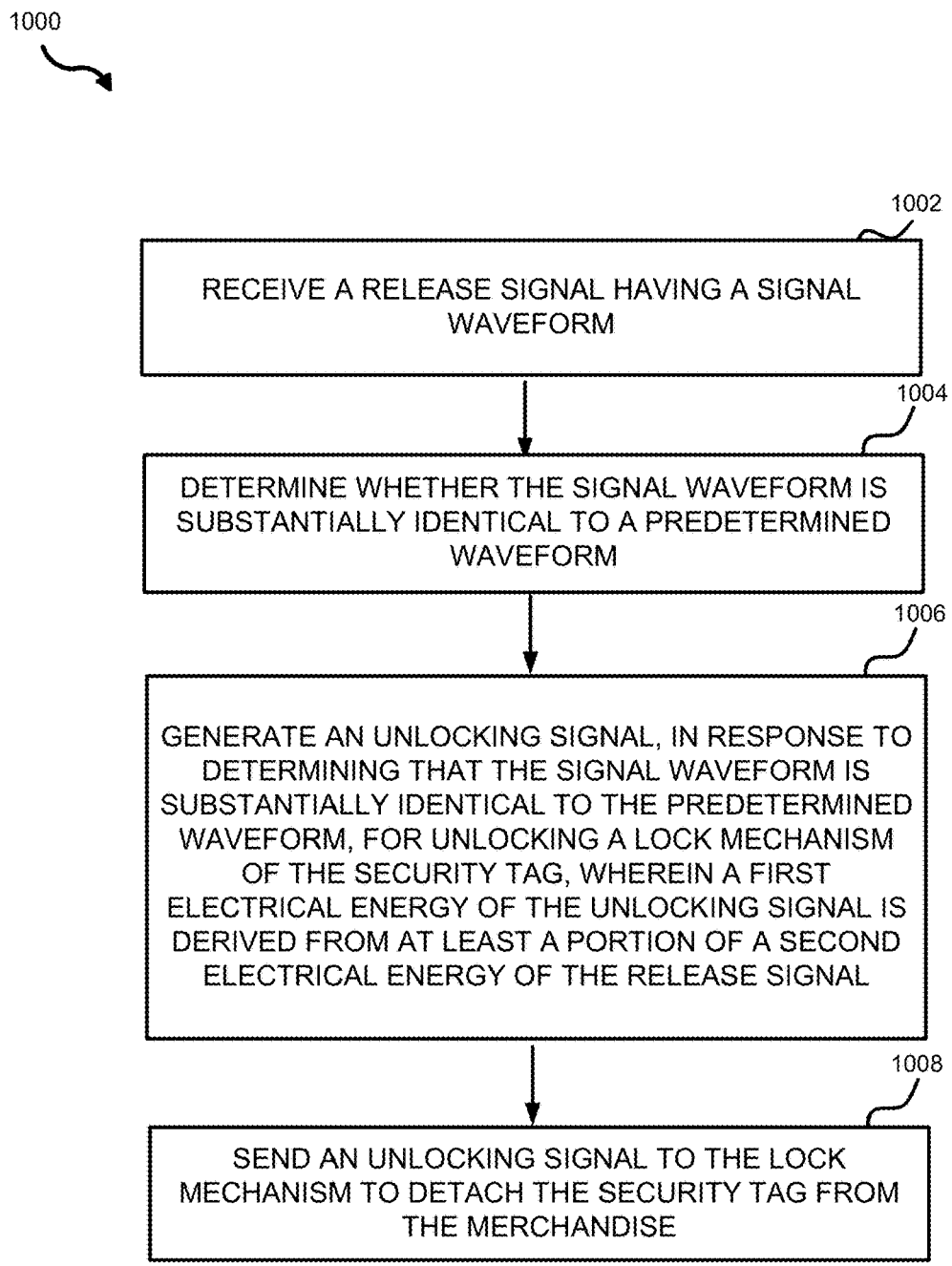
FIG. 10 illustrates an example of a method for removing a security tag in accordance with aspects of the present disclosure.

Referring to FIG. 10, an example of a method 1000 for receiving release signal energy to unlock a security tag may be performed by the controller 290.

At block 1002, the method 1000 may receive a release signal having a signal waveform. For example, the lock mechanism 280 and/or the controller 290 may receive the release signal 166 via the lock antenna 292. The release signal 166 may have the waveform 167. The controller 290 and/or the lock antenna 292 may be configured to and/or define means for receiving the release signal having a waveform. In one example, as described above, the lock antenna 292 may receive the electro-magnetic signals of the release signal 166. The lock antenna 292 may convert the electro-magnetic signals of the release signal 166 into electrical signals. The controller 290 may receive the electrical signals of the release signal 166.

At block 1004, the method 1000 may determine whether the signal waveform is substantially identical to a predetermined waveform. For example, the controller 290 may determine whether the waveform 167 is substantially identical to a predetermined waveform. The controller 290 may be configured to and/or define means for determining whether the signal waveform is substantially identical to a predetermined waveform. For example, as described above, the controller 290 may compare the particular waveform of the release signal 166 with a waveform associated with an authorized release signal. The controller 290 may compare the period, frequency, amplitude, and/or phase of the particular waveform with the waveform associated with the authorized release signal.

At block 1006, the method 1000 may generate an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal. For example, the controller 290 may generate the unlocking signal 172 for unlocking the lock mechanism 280 of the security tag 104. The controller 290 may be configured to and/or define means for generating an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal. For example, as described above, the controller 290 may generate the unlocking signal 172 by using the electrical energy of the release signal 166. The unlocking signal 172 may include electrical energy used by the lock mechanism 280 to unlock.

At block 1008, the method 1000 may send an unlocking signal to the lock mechanism to detach the security tag from the merchandise. For example, the controller 290 may send the unlocking signal 172 to the lock mechanism 280 to detach the security tag 104 from the merchandise 102. The controller 290 may be configured to and/or define means for sending an unlocking signal to the lock mechanism to detach the security tag from the merchandise. For example, as described above, the controller 290 may send the unlocking signal 172 to the lock mechanism 280 to detach the security tag 104 from the merchandise 102. In some implementations, the electrical energy in the unlocking signal 172 may be converted to mechanical energy to unlock the lock mechanism 280. For example, the electrical energy of the unlocking signal 172 may inductively cause a lock in the lock mechanism 280 to move from a lock position to an unlock position.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of unlocking a security tag, comprising:
   receiving, at a scanner, a confirmation signal to unlock the security tag from being locked to a merchandise;
   transmitting, from the scanner, a radio frequency identification (RFID) signal to a RFID device associated with the security tag to enable a controller of the security tag to receive a release signal to be transmitted by the scanner used to unlock the security tag from the merchandise, wherein the RFID signal is different than the release signal; and
   transmitting, from the scanner after transmitting the RFID signal, the release signal to the controller to unlock the security tag from the merchandise.

2. The method of claim 1, wherein transmitting the RFID signal comprises transmitting a tag identifier used by the RFID device to determine whether the RFID signal is for unlocking the security tag.

3. The method of claim 1, wherein at least a portion of an energy of the release signal is used to generate an unlocking signal for unlocking the security tag.

4. The method of claim 1, further comprising, prior to transmitting the RFID signal, encrypting the RFID signal based on at least one of an advanced encryption standard (AES) algorithm, a data encryption standard (DES) algorithm, or a MD5 encryption algorithm.

5. The method of claim 1, wherein the RFID signal enables the controller to receive the release signal by causing the RFID device to transmit an enablement signal to the controller, wherein the controller, in response to receiving the enablement signal:
   receives the release signal,
   generates an unlocking signal based on receiving the release signal, wherein a first electrical energy of the unlocking signal is derived from at least a portion of a second electrical energy of the release signal, and
   sending an unlocking signal to a lock mechanism to detach the security tag from the merchandise.

6. A scanner, comprising:
   a release signal transmitter;
   a radio frequency identification (RFID) driver;
   memory that stores instructions; and
   a processor configured to execute the instructions to:
      receive, at the scanner, a confirmation signal to unlock a security tag from being locked to a merchandise;
      cause the RFID driver to transmit, from the scanner, a RFID signal to a RFID device associated with the security tag to enable a controller of the security tag to receive a release signal to be transmitted by the scanner used to unlock the security tag from the merchandise, wherein the RFID signal is different than the release signal; and
      cause the release signal transmitter to transmit, from the scanner after transmitting the RFID signal, the release signal to the controller to unlock the security tag from the merchandise.

7. The scanner of claim 6, wherein transmitting the RFID signal comprises transmitting a tag identifier used by the RFID device to determine whether the RFID signal is for unlocking the security tag.

8. The scanner of claim 6, wherein at least a portion of an energy of the release signal is used to generate an unlocking signal for unlocking the security tag.

9. The scanner of claim 6, wherein the processor is further configured to execute the instructions to, prior to transmitting the RFID signal, encrypt the RFID signal based on at least one of an advanced encryption standard (AES) algorithm, a data encryption standard (DES) algorithm, or a MD5 encryption algorithm.

10. A method of operation of a security tag, comprising:
    receiving, at the security tag, a radio frequency identification (RFID) signal from a scanner to enable a controller of the security tag to receive a release signal to be transmitted by the scanner used to detach the security tag from a merchandise;

sending an enablement signal, in response to receiving the RFID signal, to the controller to receive the release signal;

receiving the release signal from the scanner after receiving the RFID signal;

generating an unlocking signal, in response to receiving the release signal, for unlocking a lock mechanism of the security tag, wherein a first electrical energy of the unlocking signal is derived from at least a portion of a second electrical energy of the release signal; and sending an unlocking signal to the lock mechanism to detach the security tag from the merchandise.

11. The method of claim 10, wherein receiving the RFID signal comprises receiving a tag identifier.

12. The method of claim 11, further comprising verifying whether the tag identifier is associated with the security tag, wherein generating the unlocking signal comprises generating the unlocking signal in response to verifying the tag identifier being associated with the security tag.

13. The method of claim 10, further comprising transmitting a detach confirmation signal after sending the enablement signal.

14. The method of claim 10, wherein the RFID signal is encrypted based on at least one of an advanced encryption standard (AES) algorithm, a data encryption standard (DES) algorithm, or a MD5 encryption algorithm.

15. The method of claim 14, further comprising decrypting the RFID signal.

16. A security tag, comprising:

a radio frequency identification (RFID) device configured to:

receive, at the security tag, a RFID signal from the a scanner to enable a controller of the security tag to receive a release signal to be transmitted by the scanner used to detach the security tag from a merchandise;

send an enablement signal, in response to receiving the RFID signal, to the controller to receive the release signal;

the controller configured to:

receive the release signal from the scanner after receiving the RFID signal;

generate an unlocking signal, in response to receiving the release signal, for unlocking a lock mechanism of the security tag, wherein a first electrical energy of the unlocking signal is derived from at least a portion of a second electrical energy of the release signal;

send an unlocking signal to the lock mechanism to detach the security tag from the merchandise; and the lock mechanism configured to unlock in response to receiving the unlocking signal.

17. The security tag of claim 16, wherein the RFID signal comprises a tag identifier.

18. The security tag of claim 17, wherein the controller is further configured to verify whether the tag identifier is associated with the security tag, wherein generating the unlocking signal comprises generating the unlocking signal in response to verifying the tag identifier being associated with the security tag.

19. The security tag of claim 16, wherein the RFID device is further configured to transmit a detach confirmation signal after sending the enablement signal.

20. The security tag of claim 16, wherein the RFID signal is encrypted based on at least one of an advanced encryption standard (AES) algorithm, a data encryption standard (DES) algorithm, or a MD5 encryption algorithm.

21. The security tag of claim 20, wherein the RFID device is further configured to decrypt the RFID signal.

\* \* \* \* \*